United States Patent
Inomata et al.

(10) Patent No.: US 8,982,425 B1
(45) Date of Patent: Mar. 17, 2015

(54) SELECTING INFORMATION EMBEDDING METHOD AFFECTING CORRECT INTERPRETATION BASED ON EFFECT OF EMBEDDED INFORMATION ON CONTENT DATA

(71) Applicant: Fuji Xerox Co., Ltd, Tokyo (JP)

(72) Inventors: Kohshiro Inomata, Kanagawa (JP); Hirochika Shionoiri, Kanagawa (JP); Fumihisa Suzuki, Kanagawa (JP); Yosuke Kinoshita, Kanagawa (JP); Yasushi Amano, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 0 days.

(21) Appl. No.: 14/193,733

(22) Filed: Feb. 28, 2014

(30) Foreign Application Priority Data

Aug. 23, 2013 (JP) ................. 2013-173797

(51) Int. Cl.
- *H04N 1/32* (2006.01)
- *G06K 1/12* (2006.01)
- *G06K 9/00* (2006.01)
- *G06K 15/00* (2006.01)
- *G06T 1/00* (2006.01)

(52) U.S. Cl.
CPC .......... *H04N 1/32315* (2013.01); *G06T 1/0028* (2013.01); *G06T 2201/0062* (2013.01); *H04N 2201/327* (2013.01); *H04N 2201/3233* (2013.01)
USPC .......... 358/3.28; 358/1.13; 382/100

(58) Field of Classification Search
None
See application file for complete search history.

(56) References Cited

U.S. PATENT DOCUMENTS

| | | | |
|---|---|---|---|
| 7,634,105 B2 * | 12/2009 | Moroo et al. | 382/100 |
| 8,515,120 B2 * | 8/2013 | Reed et al. | 382/100 |
| 2006/0187475 A1 | 8/2006 | Fujioka | |
| 2009/0219561 A1 | 9/2009 | Kozuka | |

FOREIGN PATENT DOCUMENTS

| | | |
|---|---|---|
| JP | 2006-217545 A | 8/2006 |
| JP | 2009-206928 A | 9/2009 |

* cited by examiner

*Primary Examiner* — Scott A Rogers
(74) *Attorney, Agent, or Firm* — Sughrue Mion, PLLC (57) ABSTRACT

An information processing apparatus includes a selecting unit and a processing unit. The selecting unit selects an embedding method from multiple embedding methods for embedding information in content data, on the basis of a first effect affecting correct interpretation of the information embedded in the content data. The processing unit causes the content data in which the information is embedded by using the embedding method selected by the selecting unit, to be processed.

20 Claims, 8 Drawing Sheets

| EMBEDDING METHOD | PROCESSING OPERATION INFORMATION | FIRST EFFECT |
|---|---|---|
| BARCODE | IMAGE BINARIZATION | 1 |
| | IMAGE THINNING | 10 |
| | IMAGE CONTRACTION | 2 |
| | IMAGE REVERSAL | 7 |
| | ... | ... |
| QR CODE | IMAGE BINARIZATION | 1 |
| | IMAGE THINNING | 2 |
| | IMAGE CONTRACTION | 1 |
| | IMAGE REVERSAL | 7 |
| | ... | ... |
| WATER MARK | IMAGE BINARIZATION | 4 |
| | IMAGE THINNING | 2 |
| | IMAGE CONTRACTION | 1 |
| | IMAGE REVERSAL | 2 |
| | ... | ... |
| ... | ... | ... |

| EMBEDDING METHOD | PROCESSING OPERATION INFORMATION | FIRST EFFECT |
|---|---|---|
| BARCODE | IMAGE BINARIZATION | 1 |
| | IMAGE THINNING | 10 |
| | IMAGE CONTRACTION | 2 |
| | IMAGE REVERSAL | 7 |
| | ... | ... |
| QR CODE | IMAGE BINARIZATION | 1 |
| | IMAGE THINNING | 2 |
| | IMAGE CONTRACTION | 1 |
| | IMAGE REVERSAL | 7 |
| | ... | ... |
| WATER MARK | IMAGE BINARIZATION | 4 |
| | IMAGE THINNING | 2 |
| | IMAGE CONTRACTION | 1 |
| | IMAGE REVERSAL | 2 |
| | ... | ... |
| ... | ... | ... |

| EMBEDDING METHOD | CONTENT TYPE | SECOND EFFECT |
|---|---|---|
| HEADER AREA | PORTRAIT IMAGE | 0 |
| | LANDSCAPE IMAGE | 0 |
| | TEXT | 0 |
| | MOVIE | 0 |
| | ... | ... |
| TEXT | PORTRAIT IMAGE | 2 |
| | LANDSCAPE IMAGE | 2 |
| | TEXT | 1 |
| | MOVIE | 3 |
| | ... | ... |
| WATER MARK | PORTRAIT IMAGE | 2 |
| | LANDSCAPE IMAGE | 1 |
| | TEXT | 2 |
| | MOVIE | 1 |
| | ... | ... |
| ... | ... | ... |

| EMBEDDING METHOD | USE OF EMBEDDED INFORMATION | THIRD EFFECT |
|---|---|---|
| HEADER AREA | NOTIFICATION OF INFORMATION | 3 |
| | RETAINING OF CONTENT INFORMATION | 2 |
| | COPYRIGHT PROTECTION | 1 |
| | ... | ... |
| TEXT | NOTIFICATION OF INFORMATION | 2 |
| | RETAINING OF CONTENT INFORMATION | 2 |
| | COPYRIGHT PROTECTION | 2 |
| | ... | ... |
| BARCODE | NOTIFICATION OF INFORMATION | 1 |
| | RETAINING OF CONTENT INFORMATION | 2 |
| | COPYRIGHT PROTECTION | 2 |
| | ... | ... |
| ... | ... | ... |

SELECTING INFORMATION EMBEDDING METHOD AFFECTING CORRECT INTERPRETATION BASED ON EFFECT OF EMBEDDED INFORMATION ON CONTENT DATA

CROSS-REFERENCE TO RELATED APPLICATIONS

This application is based on and claims priority under 35 USC 119 from Japanese Patent Application No. 2013-173797 filed Aug. 23, 2013.

BACKGROUND

Technical Field

The present invention relates to an information processing apparatus, an information processing method, and a computer-readable medium.

SUMMARY

According to an aspect of the present invention, there is provided an information processing apparatus including a selecting unit and a processing unit. The selecting unit selects an embedding method from multiple embedding methods for embedding information in content data, on the basis of a first effect affecting correct interpretation of the information embedded in the content data. The processing unit causes the content data in which the information is embedded by using the embedding method selected by the selecting unit, to be processed.

BRIEF DESCRIPTION OF THE DRAWINGS

Exemplary embodiments of the present invention will be described in detail based on the following figures, wherein.

DETAILED DESCRIPTION

1 First Exemplary Embodiment

1-1 Overall Configuration

Figure 1:
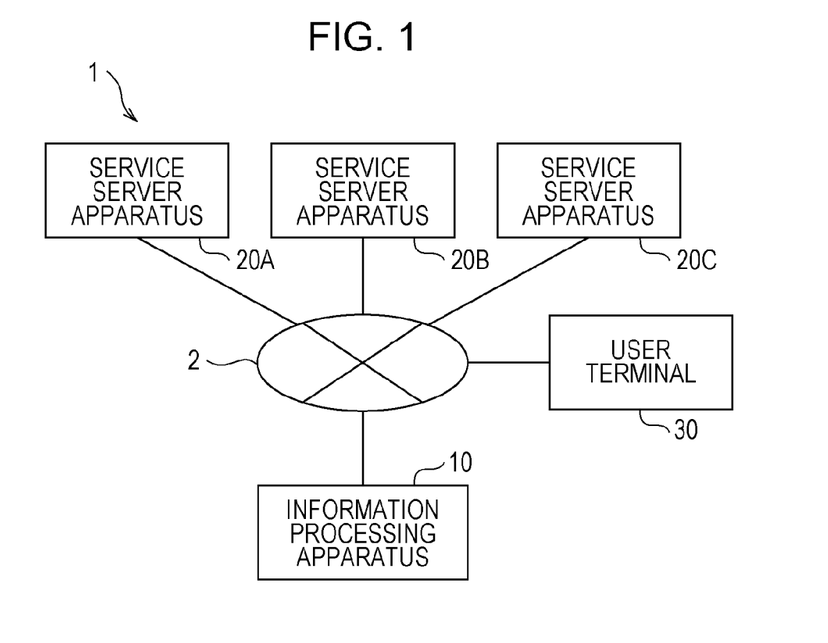
FIG. 1 is a diagram illustrating an exemplary overall configuration of an information processing system according to a first exemplary embodiment.

FIG. 1 is a diagram illustrating an exemplary overall configuration of an information processing system according to a first exemplary embodiment. FIG. 1 illustrates an information processing system 1 including a network 2, an information processing apparatus 10, service server apparatuses 20A, 20B, and 20C (hereinafter, when these are not explicitly specified, referred to as "service server apparatuses 20"), and a user terminal 30. The network 2 which is a system performing communication involving the Internet or the like mediates transfer of data between apparatuses connected to the information processing system 1. In the example in FIG. 1, the information processing apparatus 10, the service server apparatuses 20, and the user terminal 30 are connected to the network 2.

Each of the service server apparatuses 20 provides a service (hereinafter, referred to as a "processing service") in which processing on content data (process of processing content data) is performed. The content data is data representing content, such as text, an image, a movie, and a program. Examples of a processing service include services in which image processing (such as binarization, thinning, contraction, and reversal), text processing (such as translation and conversion of a specific string), and format conversion of data or an image are performed. In the first exemplary embodiment, the service server apparatuses 20A, 20B, and 20C provide a processing service of image processing, a processing service of text processing, and a processing service of format conversion, respectively. These processing services are provided in the form of what is called a cloud service. Therefore, processing on content data is not always performed by using a specific apparatus. However, to make the description easy to understand, in the example in FIG. 1, assuming that one service server apparatus 20 illustrated in FIG. 1 performs the processing.

The service server apparatus 20, for example, transmits a uniform resource locator (URL) representing the service server apparatus 20, to a destination corresponding to a user using a processing service (e.g., an electronic mail address of the user). The service server apparatus 20 transmits content data which has been processed, to an apparatus which has accessed the URL.

The user terminal 30 is an apparatus used when the user obtains content data which has been processed. The user terminal 30, which is, for example, a personal computer, a smart phone, or a tablet terminal, for example, executes mail software to receive the above-described URL, and executes a browser to access the URL. The user thus operates the user terminal 30, whereby content data which has been processed is provided for the user.

The information processing apparatus 10 is an apparatus operated when the user requests a processing service. The information processing apparatus 10 has a receiving function of receiving input of content data. The receiving function is, for example, a function of receiving content data via the network 2, a function of receiving content data supplied from a Universal Serial Bus (USB) device or the like via an interface, or a function of reading out an image formed on a medium. The information processing apparatus 10 may store content data in advance to allow the user to select a piece of content data that is to be processed.

The information processing apparatus 10 performs an embedding process of embedding information in content data that is to be processed in a processing service. Information embedded in content data through the embedding process is hereinafter referred to as "embedded information". Examples of embedded information include information of which a user is to be notified (hereinafter, referred to as "notification information"), such as the URL of a site to be viewed, information about content represented by content data (hereinafter, referred to as "content information"), such as the date and time when the content was created, an author who created the content, and information described in the content, and information about copyright of content (hereinafter, referred to as "copyright information"), such as whether or not replication is permitted, contact information when the content is to be used, and a charge to be paid when the content is used.

The embedded information is represented by text or an image in content data. Specifically, the embedded information is represented, for example, by a code obtained by converting information to be embedded, on the basis of a predetermined rule (an example in the case of text), or by a barcode (an example in the case of an image). A portion in which text or an image representing information is embedded in content data is hereinafter referred to as an "embedded portion". When the information processing apparatus 10 receives an operation performed by the user to request a processing service, the information processing apparatus 10 transmits content data in which these types of information are embedded, and the request data including information about the processing service requested by the user, to the service server apparatus 20. The service server apparatus 20 provides the processing service on the basis of the content data and the request data which are received.

1-2 Hardware Configuration

Figure 2:
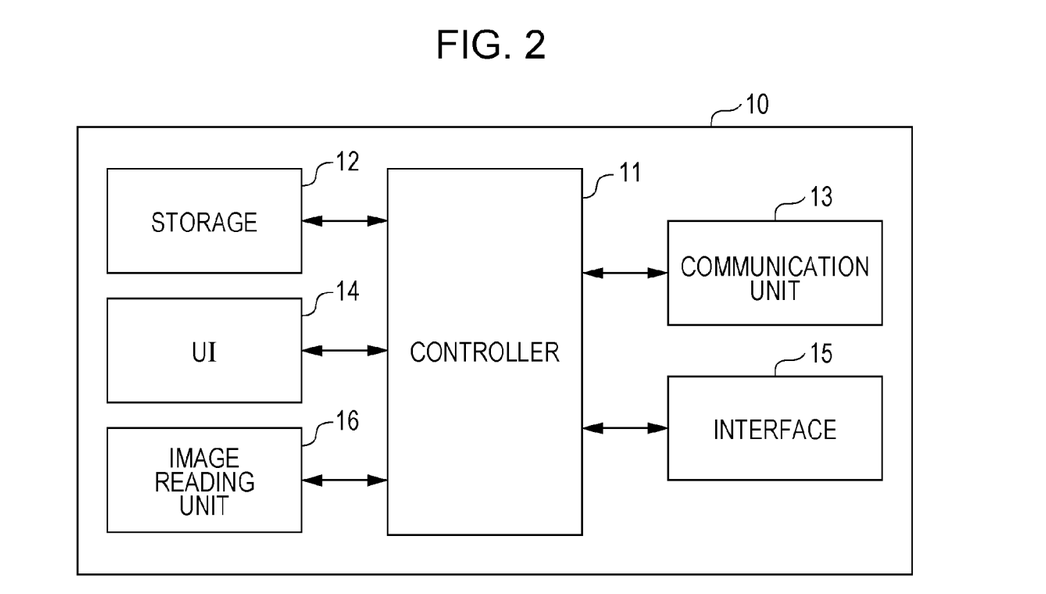
FIG. 2 is a diagram illustrating an exemplary hardware configuration of an information processing apparatus.

FIG. 2 is a diagram illustrating an exemplary hardware configuration of the information processing apparatus 10. The information processing apparatus 10 is a computer including a controller 11, a storage 12, a communication unit 13, a user interface (UI) 14, an interface 15, and an image reading unit 16. The controller 11 includes a central processing unit (CPU), a read only memory (ROM), a random access memory (RAM), and a real-time clock. The CPU uses the RAM as a work area to execute programs stored in the ROM or the storage 12, thereby controlling operations of the units. The real-time clock calculates the current date and time and notifies it to the CPU. The storage 12 which includes a hard disk or the like stores data and programs used for control exerted by the controller 11, and also stores image data.

The communication unit 13 which includes a communication line for communication receives/transmits data from/to a service server apparatus 20 via the network 2. The communication unit 13 supplies received data to the controller 11. The UI 14 which includes a display and a touch panel overlying the display receives an operation from a user and displays an image. The UI 14 supplies operation data corresponding to the received user operation to the controller 11, and the controller 11 performs a process according to the operation data. The interface 15 which is an interface including a port for inserting a USB device supplies data supplied from the USB device inserted into the port, to the controller 11. The image reading unit 16 which is, for example, a scanner optically reads out a content image formed on a medium such as paper, and supplies image data representing the read-out image to the controller 11.

1-3 Functional Configuration

The information processing apparatus 10 performs the above-described embedding process on the basis of the above-described hardware configuration. The controller 11 executes programs for performing the embedding process which are stored in the storage 12, so as to control the units, thereby achieving functions described below.

Figure 3:
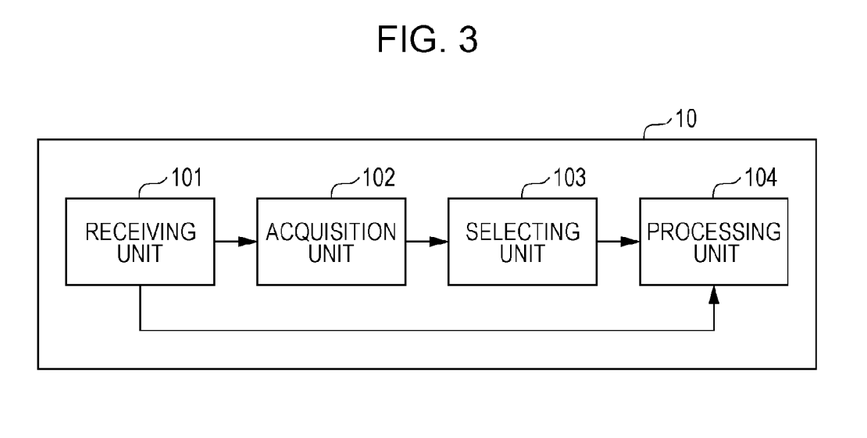
FIG. 3 is a diagram illustrating an exemplary functional configuration of the information processing apparatus.

FIG. 3 is a diagram illustrating an exemplary functional configuration of the information processing apparatus 10. The information processing apparatus 10 includes a receiving unit 101, an acquisition unit 102, a selecting unit 103, and a processing unit 104.

1-3-1 Receiving Unit 101

The receiving unit 101 is an exemplary unit for receiving a request that an external apparatus process content data. The external apparatus in the first exemplary embodiment is a service server apparatus 20. The receiving unit 101, for example, executes a program for a browser or the like to display a menu site including a menu for the processing services provided by the service server apparatus 20, on the UI 14. The menu site may be provided for each of the service server apparatuses 20, or a portal site for collectively requesting processing services provided by the service server apparatuses 20 may be provided.

Figure 4:
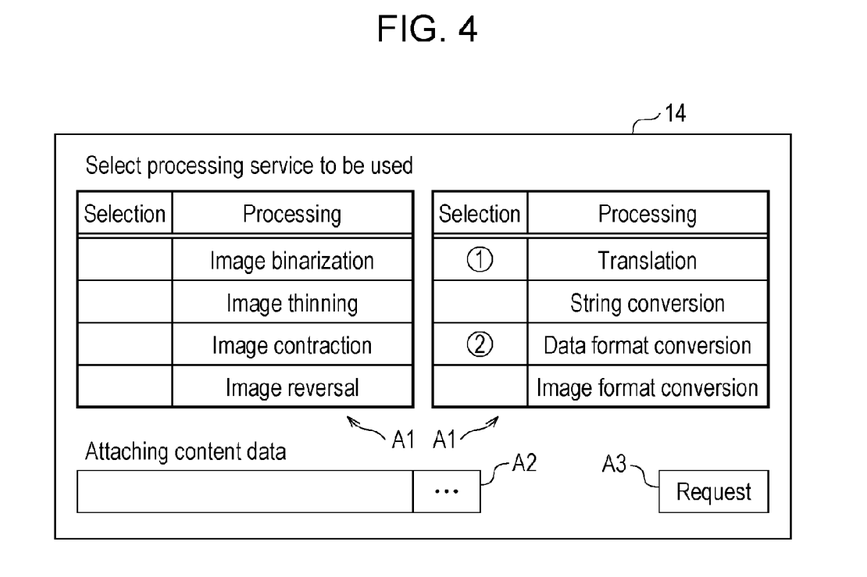
FIG. 4 is a diagram illustrating an exemplary menu site.

FIG. 4 is a diagram illustrating an exemplary menu site. In this example, a portal site for a collective menu for the processing services provided by the service server apparatuses 20 illustrated in FIG. 1 is displayed. On the UI 14, the types of processing, "image binarization", "image thinning", "image contraction", "image reversal", "translation", "string conversion", "data format conversion", and "image format conversion", selection fields A1 for indicating selection of processing, an attachment field A2 for attaching content data, and an operator image A3 for accepting a request are displayed.

A user operates the UI 14 to select processing that is to be requested, from the selection fields A1, and attaches content data that is to be processed, in the attachment field A2. In this example, numbers are sequentially displayed in the selection fields A1 in the order in which selection was performed, and the numbers represent the order in which the content data is to be processed. The user attaches content data by causing the image reading unit 16 to read out an image so as to generate data, by storing data in a USB device and supplying it via the interface 15, or by selecting a piece of data from data stored in the storage 12 in advance.

When the user presses the operator image A3 in a state in which processing operations are selected and in which content data is attached, the receiving unit 101 receives the request that the attached content data be subjected to the selected processing operations. In this example, processing operation information is briefly displayed. Alternatively, parameters representing more detailed information of each processing operation (e.g., if the processing is image binarization, thresholds for the brightness and the saturation which are used for binarization) may be set. When the request is thus received, the receiving unit 101 supplies the content data and request data including information of the request, to the acquisition unit 102 and the processing unit 104. The information of a request includes the names of selected processing operations, parameters, the order in which the processing operations are to be performed, the file name of content data, and a destination where the content data is to be stored.

1-3-2 Acquisition Unit 102

The acquisition unit 102 is an exemplary unit for acquiring information about processing operations to be performed on content data by an external apparatus. According to the first exemplary embodiment, the acquisition unit 102 acquires what the selecting unit 103 needs as described below, from the request information included in the request data supplied from the receiving unit 101, as processing operation information. Specifically, the acquisition unit 102 acquires processing operation information including the names of processing operations, parameters, and the order in which the processing operations are to be performed. The acquisition unit 102 supplies processing operation data representing processing operation information acquired as described above, along with the content data to the selecting unit 103.

1-3-3 Selecting Unit 103

The selecting unit 103 is an exemplary unit for selecting at least one method from embedding methods for embedding information in content data, on the basis of an effect (hereinafter, referred to as a "first effect") which affects correct interpretation of information embedded in the content data and which is produced when the processing is performed by using the information acquired by the acquisition unit 102. An embedding method is, for example, a method for embedding information in content data by using a technique, for example, using a one-dimensional symbol, such as a digital water mark, a water mark, or a barcode, a two-dimensional symbol such as a quick response (QR) code (registered trademark), or steganography. The embedded information is various types of information, such as notification information, content information, and copyright information as described above. The information may be embedded as plain text (data which is not encrypted) or may be embedded as cipher text (data which is encrypted).

The information is embedded so that a sender conveys information to a receiver. The embedded information is conveyed to a receiver in such a manner that the receiver views and recognizes an embedded portion (portion in which the information is embedded in the content data) or that a reading unit corresponding to an embedding method (e.g., a barcode reader) is used to read out the embedded information from an embedded portion. If a receiver knows how to read embedded information and if no other effects are exerted, all information included in the embedded information is correctly interpreted by the receiver. Interpreting all correct information means that, for example, embedded information constituted by one hundred characters is recognized so that each of the hundred recognized characters matches a corresponding one of characters which have been embedded. However, for example, when processing causes an embedded portion to be changed, the following effects may be produced: an effect in which part of the embedded information is wrongly interpreted (e.g., some of the hundred characters are recognized as different characters); an effect in which the information included in the embedded information is completely lost (e.g., words having no meaning); and an effect in which even the presence of the embedded information is not conveyed (e.g., embedded characters themselves are not recognized). Occurrence of these effects means that embedded information is not correctly interpreted. That is, these effects have a type of effect affecting correct interpretation of embedded information (first effect). The first effect will be specifically described with reference to FIGS. 5A and 5B.

Figure 5A:
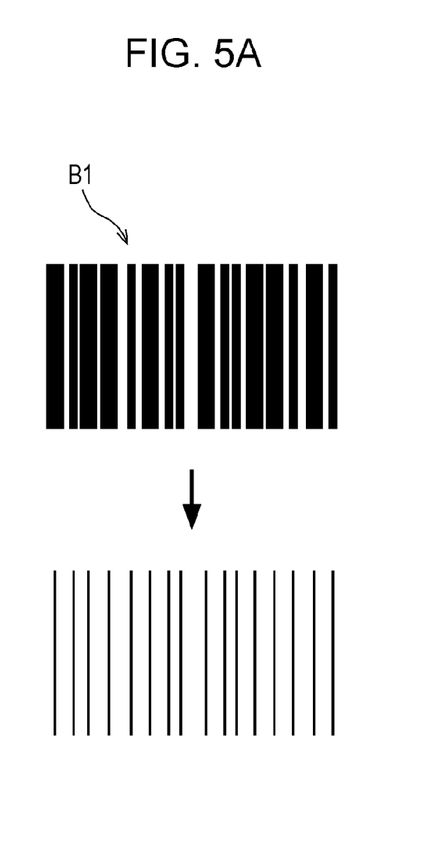
FIGS. 5A and 5B are diagrams for describing first effects.
Figure 5B:
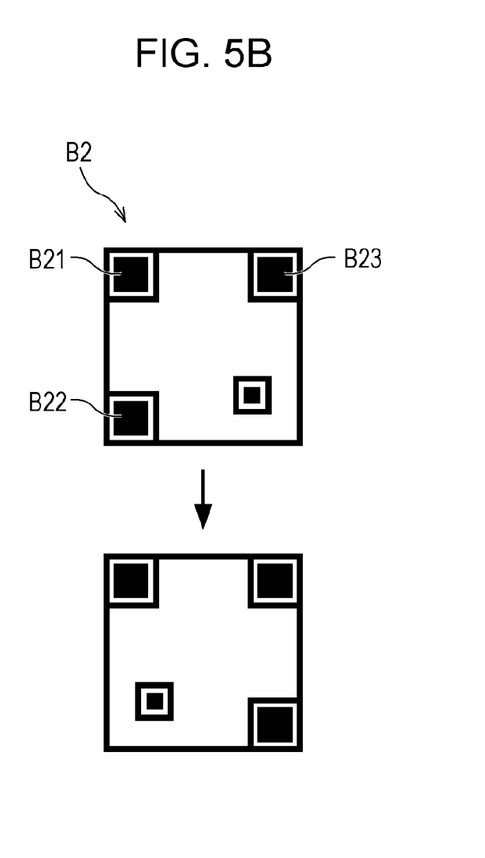

FIGS. 5A and 5B are diagrams for describing the first effect. FIG. 5A illustrates an embedded portion B1 in which a barcode represents embedded information. When content data including this embedded portion B1 is subjected to, for example, image thinning processing (image processing of converting an image into an image in which each line has a width of one pixel), a first effect occurs as follows. Each of wide bars and narrow bars included in the barcode is converted into a bar having the same width, which makes it impossible to differentiate between these bars. Accordingly, the embedded information fails to be read out by using a barcode reader or the like. FIG. 5B illustrates an embedded portion B2 in which a QR code represents embedded information. In the embedded portion B2, the arrangement of three patterns B21, B22, and B23, each of which is called a position detection pattern, allows embedded information to be read out. For example, image processing of lateral reversal performed on content data including this embedded portion B2 causes the arrangement of the patterns B21, B22, and B23 to be out of the standard, and a first effect causing the embedded information to fail to be read out occurs.

Figure 6:
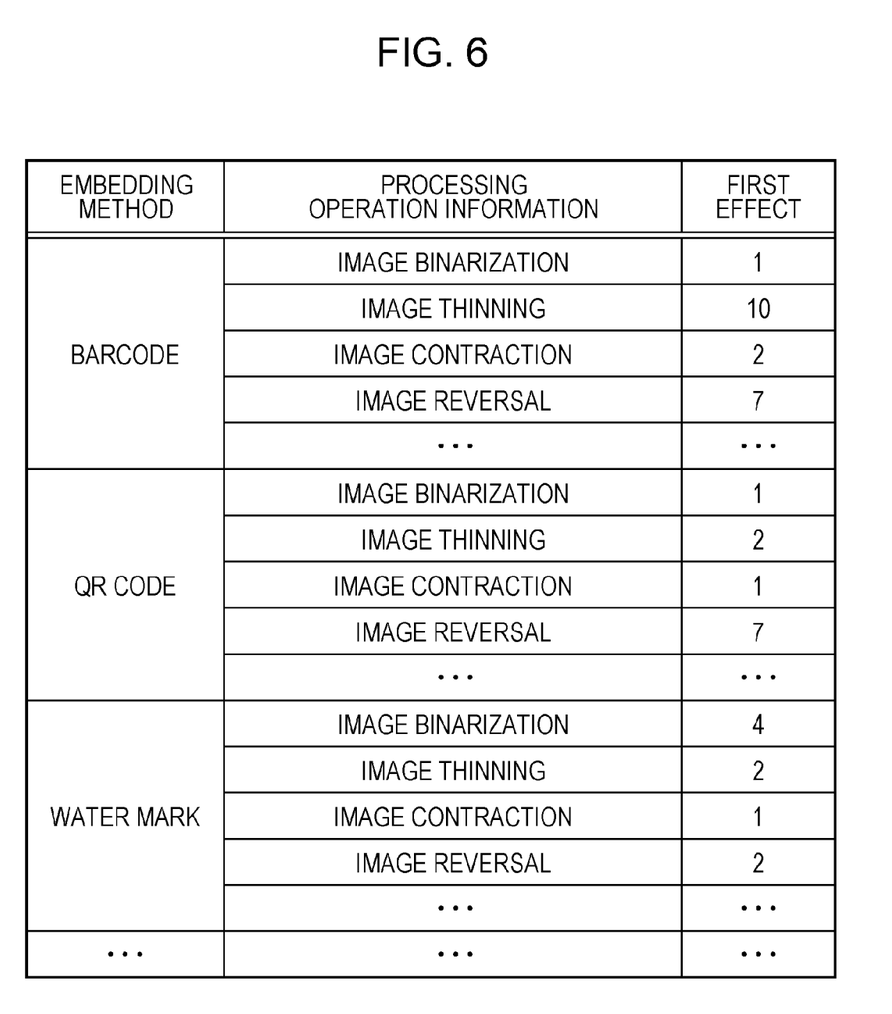
FIG. 6 is a diagram illustrating an exemplary first effect table.

The selecting unit 103 stores a first effect table in which such a first effect is associated with an embedding method and a processing method.

FIG. 6 is a diagram illustrating an exemplary first effect table. In this example, the magnitude of a first effect is represented by six numeric values, "10", "7", "4", "2", "1", and "0". The larger a value is, the larger a first effect is. In the first exemplary embodiment, for example, if embedded information is represented by text, a ratio of wrong information to the whole information (hereinafter, referred to as an "error ratio") is defined as "10", "7", "4", "2", "1", and "0" which represent the descending order of the error ratio, and one of these values is assigned to a first effect. The value "0" means that embedded information is interpreted with no errors. In the case where all embedded information fails to be interpreted, such as the case where an embedded portion fails to be read out, the value "10" is assigned to a first effect.

In the example in FIG. 6, embedding methods, "barcode", "QR code", and "water mark", are associated with pieces of processing operation information, "image binarization", "image thinning", "image contraction", and "image reversal", and corresponding first effects. In FIG. 6, for ease of description, only processing operation information regarding image processing is illustrated. Other processing operation information, such as text processing and format conversion, is associated in the first effect table. The name of processing is used as processing operation information. In addition to this, parameters used in processing, the order in which processing operations are performed, and the like may be associated as processing operation information.

For example, in the case of "barcode", the above-described pieces of processing operation information are associated with first effects of "1", "10", "2", and "7". For example, when image thinning is performed, as described in FIG. 5A, embedded information fails to be read out. In this case, an effect having such a degree that it is impossible to obtain an error ratio itself occurs. Accordingly, a first effect of the largest value "10" is associated. In the case of image reversal, read-out embedded information is totally different from the original one. Accordingly, a first effect of "7" is associated. In the case of image contraction, a ratio of the width of wide bars to that of narrow bars becomes out of the standard, and an error ratio is likely to be increased compared with one before the contraction is performed. Accordingly, a first effect of "2" is associated. In contrast, in the case of image binarization, a ratio for the width is unlikely to be out of the standard, and an error ratio is unlikely to be increased. Accordingly, a first effect of "1" is associated.

For "QR code", first effects of "1", "2", "1", and "7" are associated with the above-described pieces of processing operation information. For "water mark", first effects of "4", "2", "1", and "2" are associated. In the case of "water mark", since the density of an image such as a watermark is often thinner than that of content represented by content data, binarization often causes the image to disappear. In contrast, when a threshold is determined so that a water mark remains, an image around the water mark also remains. As a result, the water mark is unlikely to be recognized. Therefore, in the case of a water mark, a first effect of the value "4" is associated with "image binarization". Other first effects which are not described above are determined on the basis of an error ratio produced when corresponding processing is performed.

The selecting unit 103 uses embedding methods and first effects which are associated with the processing operation information included in the processing operation data supplied from the acquisition unit 102, in the first effect table, so as to select an embedding method. For example, for "image reversal", the selecting unit 103 compares first effects (in this example, which are "7", "7", and "2") associated with embedding methods, i.e., "barcode", "QR code", and "water mark", and the processing operation information, and selects an embedding method with which the smallest first effect is associated, i.e., "water mark". When the processing operation information includes "image binarization" and "image contraction", for each of the above-described embedding methods, the selecting unit 103 calculates a sum of the first effects associated with the embedding method and the processing operation information, i.e., 1+2=3, 1+1=2, and 4+1=5. The selecting unit 103 selects an embedding method "QR code" for which the calculated sum is the smallest. The selecting unit 103 notifies the processing unit 104 of the embedding method selected as described above.

As described above, in the example in FIG. 6, different values are assigned to the first effects for the following processes: a process which causes embedded information not to be read out completely (image thinning for a barcode); a process which may cause embedded information not to be read out completely (image binarization for a water mark); a process which causes embedded information to be read out as information completely different from the original information (image reversal for a barcode); and a process which causes information to be degraded (have an error) to such a degree that the degraded information may be somehow used (image binarization or contraction for a barcode). The first effect values illustrated in FIG. 6 are merely an example. The difference between the values which is defined for these processes may be smaller than that in this example, or a common value may be set for certain processes (for example, a process which causes information not to be read out completely and a process which causes information to be read out as totally different information).

1-3-4 Processing Unit 104

The processing unit 104 is an exemplary unit for performing processes for causing an external apparatus to process content data in which information is embedded by using the embedding method selected by the selecting unit 103, in accordance with the information acquired by the acquisition unit 102. In the first exemplary embodiment, the processing unit 104 performs an embedding process of embedding information in content data by using the selected embedding method, and a transmission process of transmitting the content data and the above-described request data (data including request information) to an external apparatus requested to process the content data received by the receiving unit 101.

The processing unit 104 obtains information which is to be embedded and which is input by a user who has requested a processing service, or information which is to be embedded and which is stored in advance in such a manner as to be associated with a processing service or information included in content data. The processing unit 104 embeds the obtained information to be embedded, in content data by using the embedding method selected by the selecting unit 103. As an embedding method, a known technique for generating a digital water mark, a barcode, a QR code, or the like which represents information to be embedded may be used. The processing unit 104 transmits the above-described data to a destination according to the received request information.

In the first exemplary embodiment, when the request information describes execution of image processing, text processing, and format conversion, the processing unit 104 transmits the above-described data to each of the service server apparatuses 20A, 20B, and 20C. Upon reception of the request data, each of the service server apparatuses 20 processes the content data received along with the request data, on the basis of information included in the request data. Thus, the processing unit 104 performs the embedding process and the transmission process, whereby an external apparatus processes the content data on the basis of the information acquired by the acquisition unit 102.

1-4 Operation

The information processing apparatus 10 performs the above-described embedding process on the basis of the above-described configuration.

Figure 7:
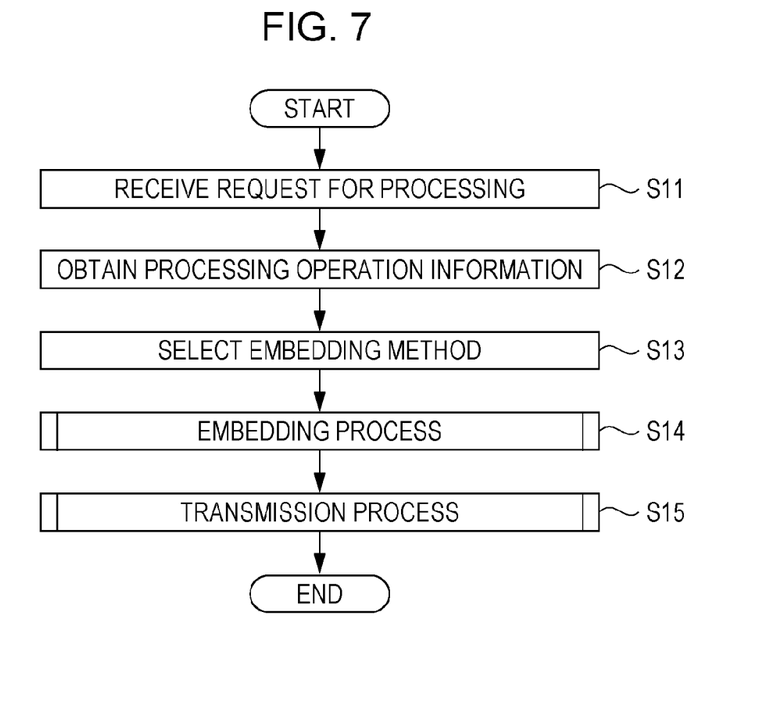
FIG. 7 is a flowchart of an exemplary operation in an embedding process performed by the information processing apparatus.

FIG. 7 is a flowchart of an exemplary operation in the embedding process performed by the information processing apparatus 10. The information processing apparatus 10 is operated by a user and receives a request for processing (request that an external apparatus process content data) (in step S11). Step S11 is an operation performed by the receiving unit 101. Then, the information processing apparatus 10 obtains information about processing operations which are to be performed on the content data by the external apparatus (in step S12). Step S12 is an operation performed by the acquisition unit 102.

The information processing apparatus 10 selects at least one method from embedding methods on the basis of the above-described first effects (in step S13). Step S13 is an operation performed by the selecting unit 103. The information processing apparatus 10 performs the above-described embedding process, i.e., a process of embedding information in the content data by using the selected embedding method (in step S14), and performs the transmission process, i.e., a process of transmitting the content data and the request data to the external apparatus (in step S15). Steps S14 and S15 are operations performed by the processing unit 104.

1-5 Other Selecting Methods

In addition to the above-described method, the selecting unit 103 uses the difference in process type of, for example, image processing, text processing, and format conversion, and also uses parameters used in processing, and the like, thereby selecting an embedding method by using four methods (referred to as first to fourth selecting methods) described below.

1-5-1 First Selecting Method

When the information acquired by the acquisition unit 102 describes text processing, the selecting unit 103 gives a high priority to selection of an embedding method (hereinafter, referred to as a "first embedding method") for embedding information represented by an image, as an embedding method based on the first effect. The text processing is, for example, the above-described text processing, i.e., translation and conversion of a specific string. The first embedding method is, for example, a method for representing embedded information in the form of an image, such as a barcode, a QR code, or a water mark. In this case, selecting unit 103 stores a first effect table in which a first effect having a small value, such as "0" or "1", is associated with a combination of the first embedding method and text processing, and in which a first effect having a value equal to or larger than "2" is associated with other combinations of an embedding method and processing operation information. Thus, the selecting unit 103 selects the first embedding method with a higher priority than other embedding methods.

Text processing on content data is often performed when the content does not include an image or when a portion of images included in the content is smaller than that of text. Therefore, compared with a case where text processing is not performed, image processing itself is unlikely to be performed. Even when image processing is performed, image processing is likely to be performed in such a manner that only areas in which images are present are processed so as not to affect text.

1-5-2 Second Selecting Method

When information acquired by the acquisition unit 102 describes processing which causes specific characters not to be converted, the selecting unit 103 selects an embedding method (hereinafter, referred to as a "second embedding method") for embedding information represented by specific characters, as an embedding method based on the first effect. The processing operation which causes specific characters not to be converted is, for example, translation from Japanese to English or English to Japanese. Across the translation, specific characters, such as Arabic numerals (e.g., 1, 2, and 3) and Roman numerals (e.g., I, V, and X), are not converted into different characters, though being converted from two-byte characters to single-byte characters. In the case where these digits are represented in two-byte characters and where they are converted into different characters, the digits represented in single-byte characters may be set as specific characters. As another example, in translation from Japanese to Chinese or Chinese to Japanese, specific idioms (including four-character idioms) are not converted into different characters across the translation.

The selecting unit 103 stores a first effect table in which a first effect having a small value, such as "0" or "1", is associated with a combination of the processing which causes specific characters not to be converted and the second embedding method. Thus the selecting unit 103 selects the second embedding method with a higher priority than other embedding methods. When the processing unit 104 expresses embedded information by using specific characters, each of these specific characters does not indicate the original meaning of the character (e.g., if it is the Roman numeral "V", a value of "5"), and indicates meaning according to a rule defined in the information processing system 1.

For example, if a rule that Roman numerals "I" to "XXVI" (i.e., 1 to 26) correspond to alphabets A to Z, respectively, is defined, "I II III" indicates "A B C". In the first exemplary embodiment, the processing unit 104 embeds information represented by using specific characters, in content data on the basis of the rule. For example, in the case where "I II III" is embedded, even when an external apparatus performs translation from Japanese to English, the embedding information remains "I II III", and represents the original information which has been embedded. Not only do specific characters which have been embedded indicate meaning according to the above-described rule, but also they may indicate their original meaning (e.g., "1" means a number of 1).

1-5-3 Third Selecting Method

When information acquired by the acquisition unit 102 describes processing which causes a specific portion in content not to be processed, the selecting unit 103 gives a high priority to selection of an embedding method (hereinafter, referred to as a "third embedding method") for embedding information in the specific portion (hereinafter, referred to as an "unprocessed portion"), as an embedding method based on the first effect. For example, when the processing operation information describes image processing which is performed only on the upper half of content or the inside of a specific frame, the lower half of the content or the outside of the frame will be an unprocessed portion. When the processing operation information describes text processing which is performed only on a predetermined paragraph or predetermined words, a portion including other paragraphs or other words will be an unprocessed portion. As another example, when the processing operation information describes processing which does not convert a data format, the header area of content data (area which is included in data and which contains attached information about the data) will be an unprocessed portion.

These unprocessed portions are represented by, for example, parameters included in the processing operation information (e.g., parameters for an area on which image processing is to be performed, parameters which represent a paragraph or a word to be converted, and parameters which represent data formats before and after conversion). The selecting unit 103 uses the parameters to embed information in the unprocessed portions.

1-5-4 Fourth Selecting Method

When information acquired by the acquisition unit 102 describes image processing, the selecting unit 103 gives a high priority to selection of an embedding method (hereinafter, referred to as a "fourth embedding method") for embedding information represented by text, as an embedding method based on the first effect. The image processing is, for example, the above-described image processing, such as image binarization, image thinning, image contraction, and image reversal. For example, in the case where content data represents a document and where a text area (area containing sentences) of the document is editable, the fourth embedding method is a method for embedding information represented by text, in an area (such as the header or the footer of a page) other than the text area. Alternatively, text representing information to be embedded may be embedded as an image in content data. In this case, the selecting unit 103 stores a first effect table in which a first effect having a small value, such as "0" or "1", is associated with a combination of the fourth embedding method and image processing, and in which a first effect having a value equal to or larger than "2" is associated with other combinations of an embedding method and processing operation information. Thus, the selecting unit 103 selects the fourth embedding method with a higher priority than other embedding methods.

2 Second Exemplary Embodiment

A second exemplary embodiment of the present invention will be described below while focusing on points different from those in the first exemplary embodiment. In the first exemplary embodiment, an embedding method is selected on the basis of processing operation information. In the second exemplary embodiment, an embedding method is selected on the basis of content data in addition to processing operation information.

2-1 Functional Configuration

Figure 8:
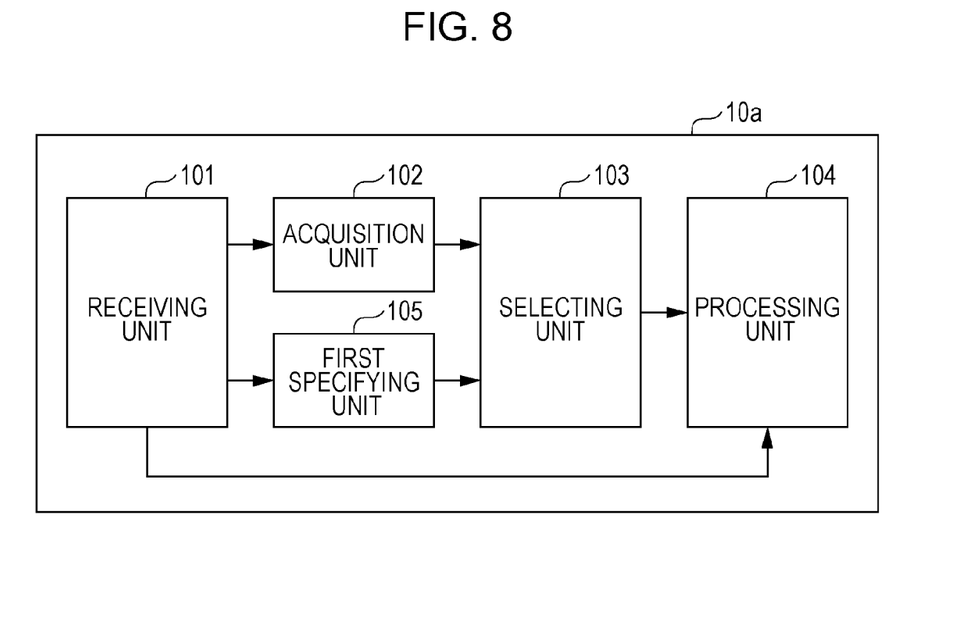
FIG. 8 is a diagram illustrating an exemplary functional configuration of an information processing apparatus according to a second exemplary embodiment.

FIG. 8 is a diagram illustrating an exemplary functional configuration of an information processing apparatus according to the second exemplary embodiment. This example illustrates an information processing apparatus 10a which includes a first specifying unit 105 in addition to the units illustrated in FIG. 3. The first specifying unit 105 is an exemplary unit for specifying content represented by content data. The first specifying unit 105 is supplied with content data from the receiving unit 101. The first specifying unit 105 analyzes content represented by the supplied content data, and specifies, from the viewpoint of content, for example, whether the type of content is "image", "text", "movie", or "program", and, if the content type is "image", whether the content illustrates a portrait, a landscape, a vehicle, or an animal or a plant. A known technique may be used for the analysis of content. The first specifying unit 105 transmits a notification of the specification data of the specified content to the selecting unit 103.

The selecting unit 103 selects an embedding method on the basis of an effect (hereinafter, referred to as a "second effect") which is exerted by embedded information (information embedded in content data) on the content value specified by the first specifying unit 105. For example, in the case where the content is a portrait, an embedded barcode or water mark may be superimposed on a person in the portrait, causing the portrait to be spoiled. In the case where the content contains sentences having a context, such as a novel or a paper, when information represented by text is embedded, words and symbols (i.e., text) which are not related to the context may appear, causing a reader to be confused. In these cases, embedded information causes a second effect causing the content value to be degraded.

Figure 9:
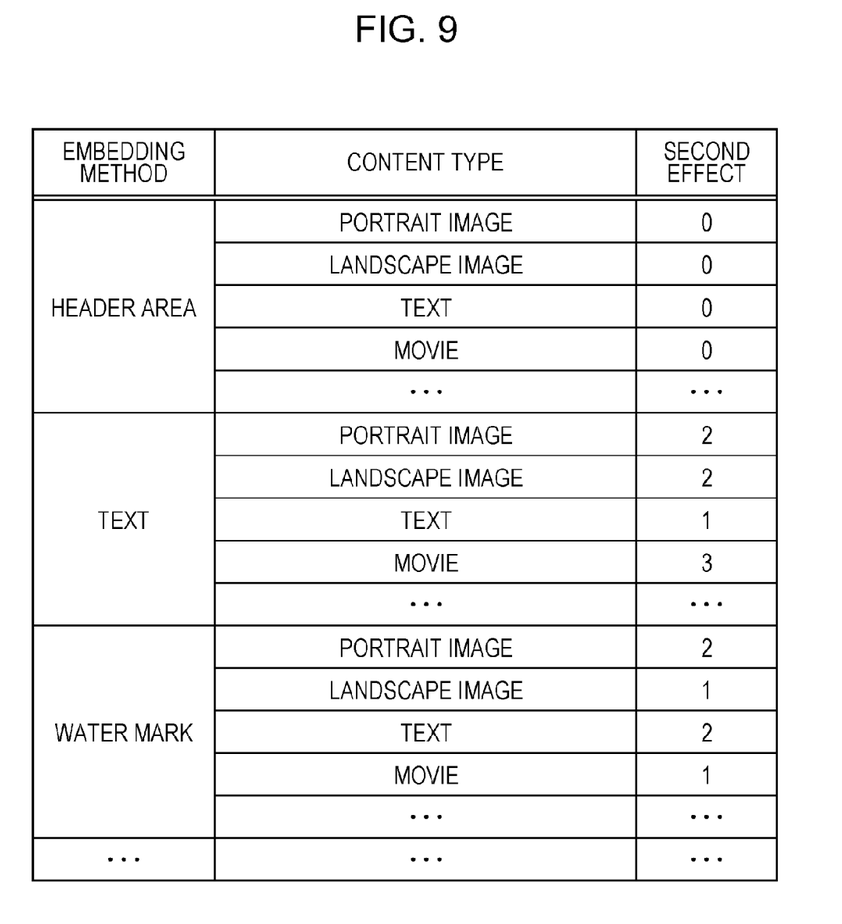
FIG. 9 is a diagram illustrating an exemplary second effect table.

The selecting unit 103 stores a second effect table in which the second effect as described above, an embedding method, and the type of content are associated with each other.

FIG. 9 is a diagram illustrating an exemplary second effect table. In this example, the magnitude of second effects is represented by four numeric values "3", "2", "1", and "0". In the example in FIG. 9, embedding methods, "header area", "text", and "water mark", are associated with content types, "portrait image", "landscape image", "text", and "movie", and corresponding second effects. The embedding method "header area" is a method for embedding information represented by text or an image in the above-described header area of content data. The embedding method "text" is a method for embedding information represented by text in content represented by content data.

For example, for the embedding method "header area", a second effect of "0" is associated with each content type. In this embedding method, since information is embedded in a portion which does not correspond to content represented by content data, i.e., a header area, the embedded portion does not cause the content to be spoiled. For the embedding method "text", second effects of "2", "2", "1", and "3" are associated with the above-described content types. For the embedding method "water mark", second effects of "2", "1", "2", and "1" are associated with the above-described content types. In this example, second effects are determined as follows. Text embedded in text spoils content to a small degree; in an image, to a medium degree; and, in a movie, to a large degree ("text"<"image"<"movie"). A water mark embedded in a landscape or a movie spoils content to a smaller degree; and, in a portrait image or text, to a larger degree ("landscape image"="movie"<"portrait image"="text").

According to the second exemplary embodiment, the selecting unit 103 selects an embedded method by using embedding methods and first effects which are associated in the first effect table with the processing operation information included in the processing operation data supplied from the acquisition unit 102 and by using embedding methods and second effects which are associated in the second effect table with the content type included in the specification data transmitted from the first specifying unit 105. For example, when the "image binarization" is to be performed on content data of "landscape image", for the embedding method "water mark", the selecting unit 103 sums a first effect ("4") associated in the first effect table and a second effect ("1") associated in the second effect table, and obtains "5". Thus, the selecting unit 103 calculates the sum of first and second effects for each of the embedding methods, and selects an embedding method for which the calculated sum is the smallest.

3 Third Exemplary Embodiment

A third exemplary embodiment of the present invention will be described below while focusing on points different from those in the first and second exemplary embodiments. In the first exemplary embodiment, an embedding method is selected on the basis of processing operation information, and in the second exemplary embodiment, in addition to these, an embedding method is selected also on the basis of the content type. In contrast, in the third exemplary embodiment, an embedding method is selected also on the basis of use of embedded information.

3-1 Functional Configuration

Figure 10:
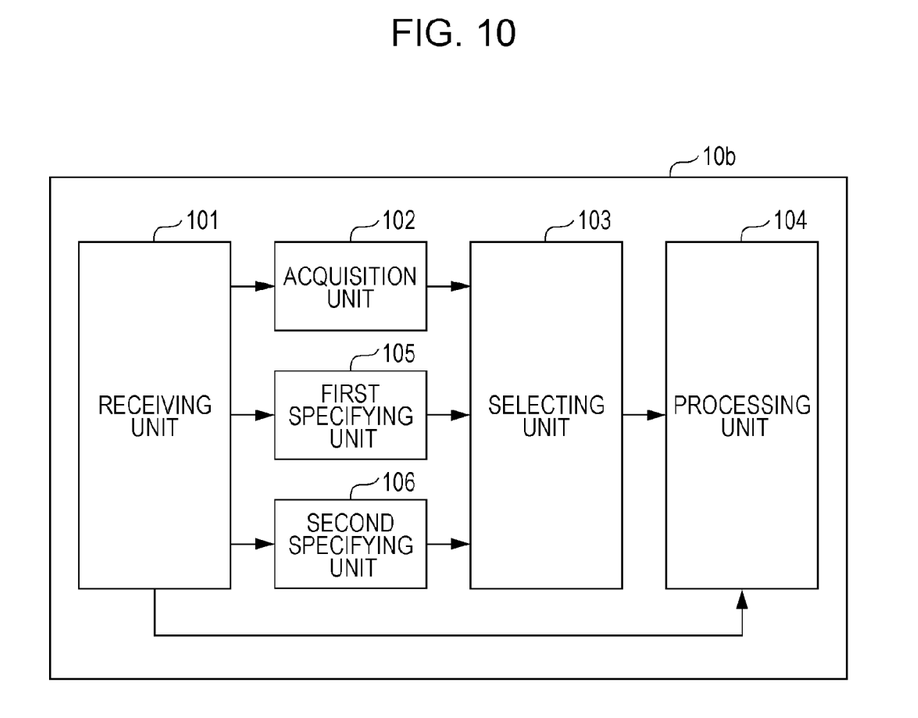
FIG. 10 is a diagram illustrating an exemplary functional configuration of an information processing apparatus according to a third exemplary embodiment.

FIG. 10 is a diagram illustrating an exemplary functional configuration of an information processing apparatus according to the third exemplary embodiment. This example illustrates an information processing apparatus 10b including a second specifying unit 106 in addition to the units illustrated in FIG. 8. In the third exemplary embodiment, the receiving unit 101 receives a request that an external apparatus process content data, and also receives selection of use of information to be embedded in content data or embedded information. Examples of use of embedded information include notification of information, retaining of information about content (content information), and copyright protection. The receiving unit 101 supplies the resulting data representing the received selection result to the second specifying unit 106.

The second specifying unit 106 is an exemplary unit for specifying use of information embedded in content data (i.e., embedded information). The second specifying unit 106 specifies use of embedded information on the basis of selection result included in the result data supplied from the receiving unit 101. For example, when the selection result represents the use of the embedding information itself, the second specifying unit 106 specifies the use. When the selection result represents information to be embedded in content data, the second specifying unit 106 infers use of the embedded information from the type of the information.

For example, when the information includes an access destination, such as a URL, a telephone number, or a mail address, the second specifying unit 106 infers that use of the information is notification of information. When the information to be embedded includes the create or update date and time of content data or an author name, the second specifying unit 106 infers that use of the embedded information is retaining of content information. When the information includes characters, such as "replication", "charge", or "license", the second specifying unit 106 infers that use of embedded information is copyright protection. The second specifying unit 106 specifies use of embedding information through the above-described inference. The second specifying unit 106 supplies use data including the specified use, to the selecting unit 103.

Figure 11:
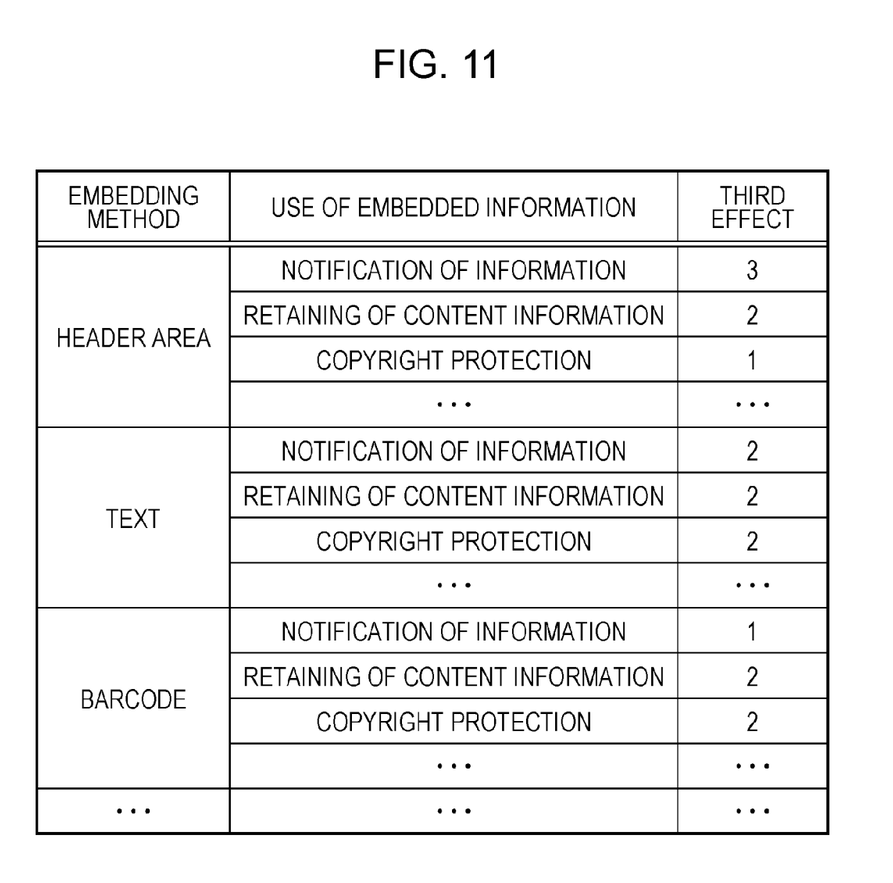
FIG. 11 is a diagram illustrating an exemplary third effect table.

The selecting unit 103 selects an embedding method on the basis of an effect (hereinafter, referred to as a "third effect") which occurs when information embedded in content data is used in the use specified by the second specifying unit 106. For example, in the case where information is embedded in a header area, if a receiver does not check the header area, the embedded information is not conveyed. In this case, when information whose use is "notification of information" is embedded, the embedded information is not used in the intended use. Thus, some embedding method may produce an effect making utilization of the information in accordance with its use impossible or difficult, as a third effect. The selecting unit 103 stores a third effect table in which an embedding method, use of the embedding information, and the third effect are associated with each other.

FIG. 11 is a diagram illustrating an exemplary third effect table. In this example, like the above-described first and second effects, the larger a third effect is, the larger its value is. In the example in FIG. 11, the embedding method "header area" is associated with uses of embedding information, "notification of information", "retaining of content information", and "copyright protection", and values representing the magnitude of a third effect, "3", "2", and "1". These uses of embedded information are also associated with the embedding method "text" and third effects of "2", "2", and "2", and are also associated with the embedding method "barcode" and third effects of "1", "2", and "2".

According to the third exemplary embodiment, the selecting unit 103 selects an embedding method by using the first and second effects described in the first and second exemplary embodiments, and also by using use of embedded information represented by the use data supplied from the second specifying unit 106, and the embedding methods and the third effects associated in the third effect table. For example, in the case where use of embedded information is "notification of information" and where, for the embedding methods, "header area", "text", and "barcode", sums of the first and second effects are "1", "3", and "2", respectively, the selecting unit 103 adds the values, "3", "2", and "1", of the third effects which are associated with the respective embedding methods in the third effect table, to the sums, and obtains resulting sums, 1+3="4", 3+2="5", and 2+1="3". The selecting unit 103 selects an embedding method whose resulting sum is the smallest among the resulting sums calculated for each of the embedding methods (in this example, "barcode" whose sum is "3").

4 Modified Exemplary Embodiments

Each of the above-described exemplary embodiments is merely an example of the present invention, and may be modified as described below. The above-described exemplary embodiments and the modified exemplary embodiments described below may be combined with each other as necessary and the combined embodiment may be embodied.

4-1 Processing Unit

In the above-described exemplary embodiments, the processing unit 104 performs the embedding process and the transmission process. However, the present invention is not limited to this. The processing unit 104 may perform either of the embedding process and the transmission process. Alternatively, instead of performing the embedding process and the transmission process, the processing unit 104 may cause another unit in the information processing apparatus 10 or an external apparatus to perform these processes. In this case, for example, the processing unit 104 transmits a notification of an embedding method selected by the selecting unit 103 so as to cause the embedding process to be performed by using the embedding method, and transmits a notification of the destination of an external apparatus that is to be requested to perform processing, so as to cause content data in which information is embedded and request data describing the request to be transmitted to the destination. In short, any configuration may be employed as long as, when the processing unit 104 performs any process, an external apparatus performs processing in accordance with information acquired by the acquisition unit 102, on content data in which information is embedded by using the embedding method selected by the selecting unit 103.

4-2 how to Represent Effect

The first, second, and third effects are represented by eleven numeric values from 0 to 10 in the above-described examples. The present invention is not limited to this. For example, they may be represented by numeric values larger than 10, minus numeric values, decimals, or the like. These effects may be represented by symbols or characters, such as "A", "B", and "C", or "large", "medium", and "small", not numeric values. In short, any representation may be employed as long as the degrees of the magnitudes of these effects may be differentiated from each other.

4-3 Comparison Using Multiple Effects

According to the above-described exemplary embodiments, the selecting unit 103 compares sums of the first, second, and third effects to select an embedding method. The present invention is not limited to this. For example, the selecting unit 103 may weight effects and sum the weighted effects. The selecting unit 103 may compare results obtained by performing multiplication, division, subtraction, or the like on effects. In short, any configuration may be employed as long as the selecting unit 103 selects an embedding method on the basis of the first, second, and third effects.

4-4 Selection Using Multiple Methods

The selecting unit 103 may select an embedding method on the basis of only either one of the first, second, and third effects, or may select an embedding method on the basis of a combination of either two of the effects (for example, either of the first and second effects, the first and third effects, and the second and third effects). In addition to these, the selecting unit 103 may select an embedding method by using either one or a combination of the four selecting method (first to fourth embedding methods) described in the first exemplary embodiment.

4-5 Selecting Multiple Embedding Methods

In the above-described exemplary embodiments, the selecting unit 103 selects one embedding method. The present invention is not limited to this. For example, the selecting unit 103 may select multiple embedding methods.

For example, the selecting unit 103 selects embedding methods, the number of which is predetermined, e.g., two or three embedding methods whose sums of the first, second, and third effects are the smallest, the second smallest, and so on. In this case, information is embedded by using the selected embedding methods. Alternatively, different pieces of embedding information may be embedded by using respective selected embedding methods. In short, any configuration may be employed as long as the selecting unit 103 selects at least one embedding method from multiple embedding methods.

4-6 Service Server Apparatus 20

In the above-described exemplary embodiments, a service server apparatus 20 provides a service of processing content data. In addition to this, the service server apparatus 20 may provide a service of processing no content data. A service of processing no content data is, for example, a service of extracting a specific string included in the content data, or a service of making a replication of the content data. In these services, the original content data is not processed. Accordingly, information embedded in the content data is not processed, and the original information is retained.

4-7 Case where Processing Operation Information is not Acquired

It is not necessary for the information processing apparatus to include an acquisition unit, for example, when the processing operation performed by a service server apparatus 20 is predetermined. In this case, the selecting unit 103 selects an embedding method from multiple embedding methods for embedding information in content data, on the basis of the first effects affecting correct interpretation of information embedded in the content data. The processing unit 104 causes the content data in which the information is embedded by using an embedding method selected by the selecting unit 103 to be processed. The selecting unit 103 and the processing unit 104 perform these operations on the precondition that the selecting unit 103 and the processing unit 104 know the processing operation. For example, in the above-described first, second, and fourth selecting methods, when the processing unit 104 performs text processing, processing in which specific characters are not converted, and image processing, respectively, the selecting unit 103 performs the above-described selection. In the third selecting method, when the processing unit 104 performs processing in which a specific portion in content is not processed, the selecting unit 103 performs the above-described selection.

4-8 Category of the Invention

The present invention may be interpreted as an information processing method for achieving a process performed by an information processing apparatus or the like, in addition to an information processing apparatus and an information processing system including an information processing apparatus. The process here is, for example, the embedding process illustrated in FIG. 7. In addition, the present invention may be also interpreted as a program for causing a computer such as an information processing apparatus to function as the units illustrated in FIG. 3 or the like. The program may be provided by using a recording medium, such as an optical disk, storing the program, or may be provided by downloading the program to a computer via a network such as the Internet and installing the program so that the program is ready to use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a selecting unit that selects an embedding method from a plurality of embedding methods for embedding information in content data, on the basis of a first effect affecting correct interpretation of the information embedded in the content data; and
   a processing unit that causes the content data in which the information is embedded by using the embedding method selected by the selecting unit, to be processed.

2. The information processing apparatus according to claim 1, further comprising:
   a first specifying unit that specifies content represented by the content data,
   wherein the selecting unit selects the embedding method also on the basis of a second effect, exerted by the information embedded in the content data, on a value of the content specified by the first specifying unit.

3. The information processing apparatus according to claim 1, further comprising:
   a second specifying unit that specifies use of the information embedded in the content data,
   wherein the selecting unit selects the embedding method also on the basis of a third effect produced when the information embedded in the content data is used in accordance with the use specified by the second specifying unit.

4. The information processing apparatus according to claim 2, further comprising:
   a second specifying unit that specifies use of the information embedded in the content data,
   wherein the selecting unit selects the embedding method also on the basis of a third effect produced when the information embedded in the content data is used in accordance with the use specified by the second specifying unit.

5. The information processing apparatus according to claim 1,
   wherein the selecting unit selects the embedding method for embedding the information represented by an image, as an embedding method based on the first effect with high priority, when the processing unit causes text processing to be performed.

6. The information processing apparatus according to claim 2,
   wherein the selecting unit selects the embedding method for embedding the information represented by an image, as an embedding method based on the first effect with high priority, when the processing unit causes text processing to be performed.

7. The information processing apparatus according to claim 3,
   wherein the selecting unit selects the embedding method for embedding the information represented by an image, as an embedding method based on the first effect with high priority, when the processing unit causes text processing to be performed.

8. The information processing apparatus according to claim 4,
wherein the selecting unit selects the embedding method for embedding the information represented by an image, as an embedding method based on the first effect with high priority, when the processing unit causes text processing to be performed.

9. The information processing apparatus according to claim 1,
wherein the selecting unit selects the embedding method for embedding the information represented by a specific character, as an embedding method based on the first effect, when the processing unit causes processing in which the specific character is not converted, to be performed.

10. The information processing apparatus according to claim 2,
wherein the selecting unit selects the embedding method for embedding the information represented by a specific character, as an embedding method based on the first effect, when the processing unit causes processing in which the specific character is not converted, to be performed.

11. The information processing apparatus according to claim 3,
wherein the selecting unit selects the embedding method for embedding the information represented by a specific character, as an embedding method based on the first effect, when the processing unit causes processing in which the specific character is not converted, to be performed.

12. The information processing apparatus according to claim 4,
wherein the selecting unit selects the embedding method for embedding the information represented by a specific character, as an embedding method based on the first effect, when the processing unit causes processing in which the specific character is not converted, to be performed.

13. The information processing apparatus according to claim 5,
wherein the selecting unit selects the embedding method for embedding the information represented by a specific character, as an embedding method based on the first effect, when the processing unit causes processing in which the specific character is not converted, to be performed.

14. The information processing apparatus according to claim 6,
wherein the selecting unit selects the embedding method for embedding the information represented by a specific character, as an embedding method based on the first effect, when the processing unit causes processing in which the specific character is not converted, to be performed.

15. The information processing apparatus according to claim 7,
wherein the selecting unit selects the embedding method for embedding the information represented by a specific character, as an embedding method based on the first effect, when the processing unit causes processing in which the specific character is not converted, to be performed.

16. The information processing apparatus according to claim 8,
wherein the selecting unit selects the embedding method for embedding the information represented by a specific character, as an embedding method based on the first effect, when the processing unit causes processing in which the specific character is not converted, to be performed.

17. The information processing apparatus according to claim 1,
wherein the selecting unit selects the embedding method for embedding the information in a specific portion in content, as an embedding method based on the first effect with high priority, when the processing caused by the processing unit does not involve performing processing on the specific portion.

18. The information processing apparatus according to claim 1,
wherein the selecting unit selects the embedding method for embedding the information represented by text, as an embedding method based on the first effect with high priority, when the processing unit causes image processing to be performed.

19. A non-transitory computer readable medium storing a program causing a computer to execute a process comprising:
selecting an embedding method from a plurality of embedding methods for embedding information in content data, on the basis of a first effect affecting correct interpretation of the information embedded in the content data; and
causing the content data in which the information is embedded by using the selected embedding method to be processed.

20. An information processing method comprising:
selecting an embedding method from a plurality of embedding methods for embedding information in content data, on the basis of a first effect affecting correct interpretation of the information embedded in the content data; and
causing the content data in which the information is embedded by using the selected embedding method to be processed.

* * * * *